May 5, 1970            C. KARAPETIAN            3,509,814

DISPOSABLE BARBEQUE GRILL

Filed March 20, 1968            2 Sheets-Sheet 1

INVENTOR.
CARL KARAPETIAN
BY
ATTORNEYS

May 5, 1970  C. KARAPETIAN  3,509,814
DISPOSABLE BARBEQUE GRILL
Filed March 20, 1968  2 Sheets-Sheet 2

INVENTOR.
CARL KARAPETIAN
BY
ATTORNEYS

United States Patent Office 3,509,814
Patented May 5, 1970

3,509,814
DISPOSABLE BARBEQUE GRILL
Carl Karapetian, 1735 W. Lane Drive NE.,
Grand Rapids, Mich. 49505
Filed Mar. 20, 1968, Ser. No. 714,735
Int. Cl. A47j 37/07
U.S. Cl. 99—445                    9 Claims

ABSTRACT OF THE DISCLOSURE

This disclosure relates to a disposable, crushable, self-supporting grill for outdoor cooking and the like. The grill has side walls, a top surface, and interconnected, downwardly extending, strengthening indentations. The grill is made from thin metallic material such as aluminum, so that the grill is inexpensively manufactured and can be crushed for easy disposal.

---

This invention relates to disposable grills. In one of its aspects it relates to a disposable crushable, self-supporting grill for outdoor cooking and the like comprising a unitary body formed of thin metallic sheet material such that the grill is crushable, the body having upstanding continuous side walls and a top surface containing a plurality of openings and a pluraltiy of downwardly extending, strengthening indentations forming an interconnected grid work.

In another of its aspects, the invention relates to a disposable, crushable, self-supporting grill as has been hereinbefore described wherein the grill top is circularly shaped, a portion of the indentations extend radially from a central area and another portion of the indentations form concentric circles about the central area, intersecting the radially extending indentations.

In another of its aspects, the invention relates to a disposable, crushable, self-supporting grill for outdoor cooking and the like as has been hereinbefore described wherein the top surface is rectangularly shaped and the indentations comprise a plurality of substantially perpendicular intersecting indentations which are substantially parallel to the side walls.

Barbequing on outdoor grills and the like has become a very popular method of cooking. The food is placed on an open grill work directly above a heat source and is thereby cooked by the heat source. During the cooking operation, fats and juices drip down into the fire and accumulate on the open grill work. Generally, the grill work is either not cleaned at all, or is not cleaned until long after the fats and juices have been hardened by the heat and cooled. Thus, the popular past time has certain unsterile and tedious aspects.

One solution to the problem has been suggested by Hohe, 3,082,757. Hohe discloses a cover to fit congruently over a permanent grill so that portions of the grill are protected from fat and juice drippings. However, not all parts of the grill are covered and the fats and juices are still likely to leak beneath the cover. Further, different grill structures require different covers so that a different cover would be required for each kind of grill.

I have now discovered a sanitary, crushable, and disposable grill made from thin metallic material, which grill, by interconnected indentations and continuous side walls, is made self-supporting so that the grill can be used independently or in conjunction with permanent grills. The grill is inexpensive to manufacture and can be easily disposed of after use.

By various aspects of this invention one or more of the following, or other, objects can be obtained.

It is an object of this invention to provide a crushable and disposable cooking grill which can be used with or without a permanent grill.

It is a further object of this invention to provide an inexpensive, self-supporting, crushable, and disposable grill for sanitary outdoor cooking without the necessity of cleaning the permanent grill.

It is a further object of this invention to provide a sanitary, disposable grill wherein fats and juices are carried away from cooking areas.

It is yet another object of this invention to provide a disposable grill which can be used with different size and shape permanent grills.

Other aspects, objects, and the several advantages of this invention are apparent to one skilled in the art from a study of this disclosure, the drawings, and the appended claims.

According to the invention, there is provided a disposable, crushable, self-supporting grill for outdoor cooking and the like. The grill is formed from a unitary body of thin sheet metal material such as aluminum foil. The thickness of the sheet material is such that the grill is readily crushable when it is desired to dispose of the same. The grill is strong enough to support food on the grill, even at high temperatures but will be crushable with moderate force such as that required to collapse aluminum beer cans or such as that required to crush aluminum pie plates. The grill generally has a continuous upstanding side wall and a top surface. The top surface contains a plurality of openings and a plurality of strengthening indentations extending downwardly of the top surface forming an interconnected grid work of the indentations. The grid work is preferably interconnected with the side walls so that the juices and fats collected in the indentations will be carried to the side walls and so that the grill maintains the utmost strength required for supporting food products when in use.

Preferably the grill contains a continuous rim around the side wall which collects the fats and juices from the indentations. A pour spout is preferably formed in the upturned rim of the side walls to permit the juices and fats to be drained therefrom.

The invention will now be described with reference to the accompanying drawings in which.

Figure 2:
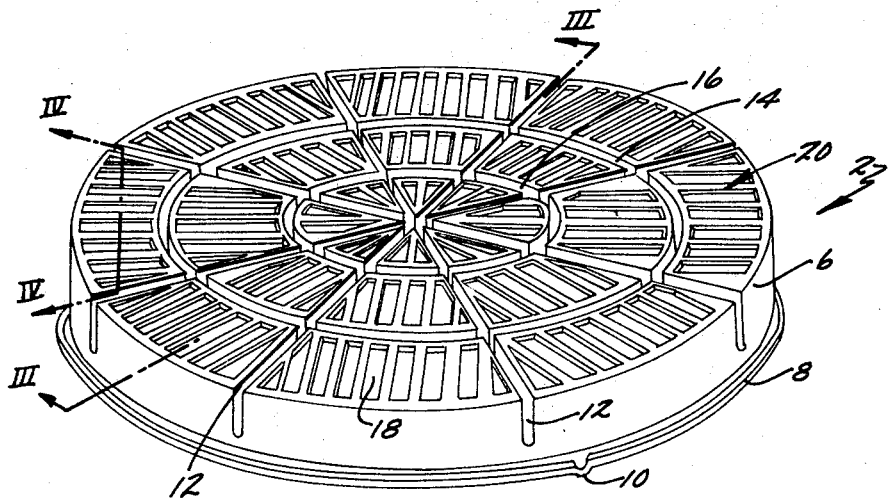
FIG. 2 is a perspective view in greater detail of the disposable grill shown in FIG. 1.
Figure 3:
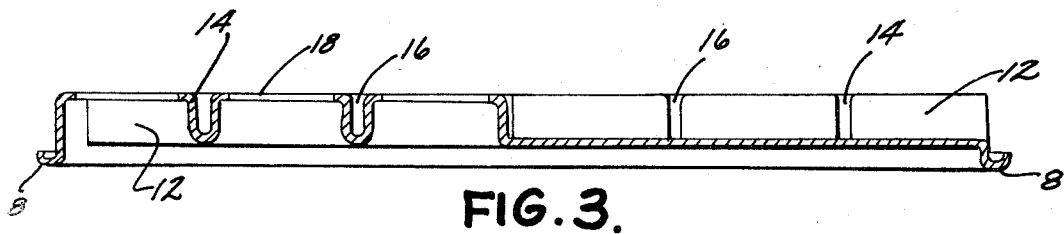
FIG. 3 is a sectional view along lines III—III of FIG. 2.
Figure 1:
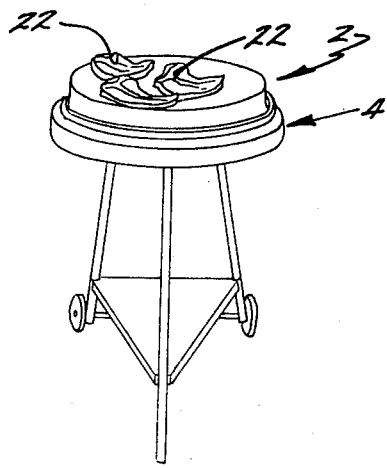
FIG. 1 is a perspective view of the novel disposable grill as positioned on a conventional charcoal cooking apparatus.

Referring now to the drawings, and to FIGS. 1 through 5 in particular, a disposable grill 2 is positioned on a conventional, permanent barbeque charcoal cooking apparatus 4 and has positioned thereon food products 22 for cooking. The disposable grill has a continuous upstanding side wall 6 terminating at the lower end thereof in an upturned rim 8. A pour spout 10 is provided at a portion of the upturned rim 8.

The upper portion of the continuous side wall 6 terminates in a top surface generally designated as 20. The top surface has a plurality of downwardly extending radial indentations 12 and downwardly extending circular indentations 14 and 16. The circular indentations 14 and 16 form concentric circles around a central portion and intersect the downwardly extending radial indentations 12. The top is also provided with a plurality of openings 18 which are positioned between the intersecting indentations 12, 14, and 16. A plurality of openings 18 are positioned within each of the areas defined by the downwardly extending indentations 12, 14, and 16, and between the indentations and the side wall 6.

Figure 5:
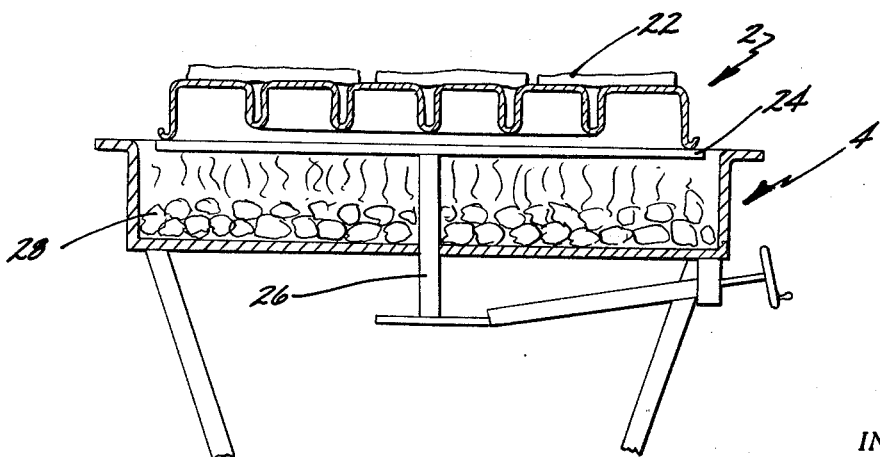
FIG. 5 is a side elevational view, partly in section, of the disposable grill and charcoal cooking apparatus shown in FIG. 1.

As can be seen from FIG. 5, the disposable grill 2 can be positioned on top of a permanent grill 24 and supported through a central supporting rod 26. The food products are cooked by fired charcoal 28 in the cooking apparatus pan.

Figure 6:
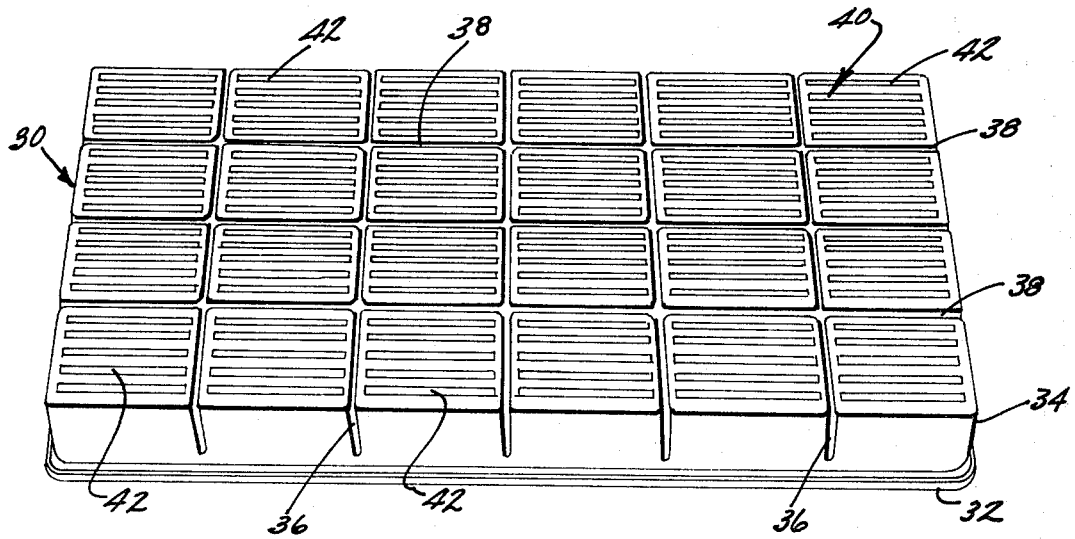
FIG. 6 is a perspective view of a second embodiment of the invention.
Figure 4:
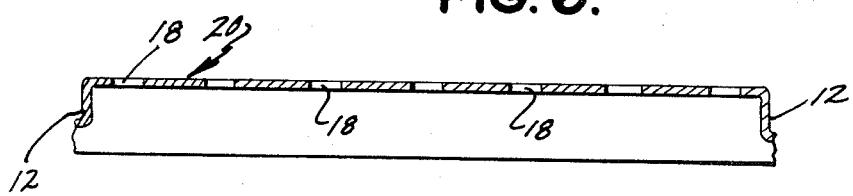
FIG. 4 is a sectional view along lines IV—IV of FIG. 2 and FIG. 3.

In FIG. 6, an alternate embodiment of the invention is shown. In this embodiment, the disposable grill 30 is rectangular in shape and has a continuous upstanding side wall 34 which terminates at the lower portion in an upturned rim 32. The disposable grill 30 has a top surface 40 in which are formed a plurality of downwardly extending lateral indentations 36 and a plurality of downwardly extending longitudinal indentations 38. The indentations are parallel to the side walls.

Within each formed by the intersecting indentations 36 and 38 and by the indentation on the side walls, there is formed a plurality of openings 42. The openings are parallel to each other and longitudinally spaced within the areas so formed by the intersecting indentations and the side walls.

In both embodiments, the intersecting indentations strengthen the grill so as to make it self-supporting with or without the use of a permanent grill. The indentations also collect juices and fats and permit them to run to the sides of the grill and to be collected in the upturned rim at the bottom portion of the side wall. The juices can then be drained off through the spout such as that shown in FIG. 2. The openings in the top surface of the disposable grills shown in the drawings permit heat and smoke to pass up from a fire which cooks the food products placed on the top of the grill. The passing of the smoke through the openings permits the desired charcoal flavor to be imparted to the food products.

Whereas the disposable grill of the invention has been shown positioned on a permanent grill in a charcoal cooking apparatus, it is obvious that the disposable grill of the invention can be employed without a permanent grill. The self-supporting nature of the disposable grill permits it to be used in any cooking environment whereby the grill can be supported at the side walls.

The grill can be easily and inexpensively formed from a thin metallic material, such as aluminum foil. The grill can be made from a thin sheet of metallic material by simply stamping the holes while simultaneously, subsequently, or previously forming the indentations and upturned rims. As an alternate form of the invention, the openings (18, 42) in the top of the grill can be formed by cutting the metal and forcing it downwardly, without removing the metal. In this case, the openings would each have depending flanges which would further enhance the self-supporting nature of the grill.

The thickness of the metallic material is such that the grill is crushable with moderate force by hand. The thickness of the metallic material will therefore be in the same range as that presently used for disposable pie plates, containers for frozen food products such as "TV Dinners," cakes, and the like.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A disposable, crushable, self-supporting grill for outdoor cooking and the like comprising: a unitary body formed of thin sheet metallic material such that said grill is crushable with moderate force; said body having a continuous upstanding side wall and a top surface; a plurality of openings in said top surface to permit heat to pass through said top surface; a plurality of intersecting strengthening indentations extending downwardly of said top surface forming an interconnected grid work of said indentations, said grid work providing sufficient strength to permit said body to be self-supporting, even when resting on said side walls and containing food on the top surface thereof.

2. A disposable, crushable, self-supporting grill according to claim 1 wherein said side walls have an outer rim, said interconnected indentations have openings into said side walls so that fats and juices collected by said indentations can flow into said outer rim.

3. A disposable, crushable, self-supporting grill according to claim 2 wherein a drain spout is formed in a portion of said upturned outer rim for removing juices and fats from said rim.

4. A disposable, crushable, self-supporting grill according to claim 1 wherein said thin sheet metal material is aluminum foil.

5. A disposable, crushable, self-supporting grill according to claim 1 wherein said top surface has a generally circular shape and a portion of said indentations extend radially from a central area and another portion of said indentations form concentric circles about said central area intersecting said radially extending indentations.

6. A disposable, crushable, self-supporting grill according to claim 5 wherein said openings in said top surface are generally longitudinally shaped and positioned within areas formed by intersecting indentations and extending generally in a radial direction.

7. A disposable, crushable, self-supporting grill according to claim 1 wherein said top surface is generally rectangularly shaped, said indentations comprise a plurality of substantially perpendicular intersecting indentations which are substantially parallel to the sides of said top surface.

8. A disposable, crushable, self-supporting grill according to claim 7 wherein said openings in said top surface are generally longitudinal in shape and a plurality of said openings are positioned within each area formed by said intersecting indentations.

9. A disposable, crushable, self-supporting grill for outdoor cooking and the like comprising: a unitary body formed of thin sheet metallic material such that said grill is crushable with moderate force; said body having a top surface and a continuous upstanding side wall depending therefrom and extending around each edge of said top surface; the bottom of said side wall being substantially co-planar and substantially parallel to said top surface; a plurality of openings in said top surface to permit heat to pass through said top surface; a plurality of strengthening indentations extending downwardly of said top surface to a point in proximal relationship to the plane of said bottom of said side walls, said indentations and side walls providing sufficient strength to permit said body to be self-supporting, even when resting on said side walls and containing food on the top surface thereof.

References Cited

UNITED STATES PATENTS 2,908,214 10/1959 Persinger.
3,082,757 3/1963 Hohe.
3,385,282 5/1968 Lloyd.

CHARLES J. MYHRE, Primary Examiner

U.S. Cl. X.R.
126—9, 25